No. 717,404. Patented Dec. 30, 1902.
J. HOPPER.
WHEEL FOR VEHICLES.
(Application filed Apr. 29, 1902.)

(No Model.) 3 Sheets—Sheet 1.

Witnesses:
P. F. Sonnek
J. Green

Inventor,
John Hopper,
By Knight Bros.
Attys.

No. 717,404. Patented Dec. 30, 1902.
J. HOPPER.
WHEEL FOR VEHICLES.
(Application filed Apr. 29, 1902.)
(No Model.) 3 Sheets—Sheet 2.
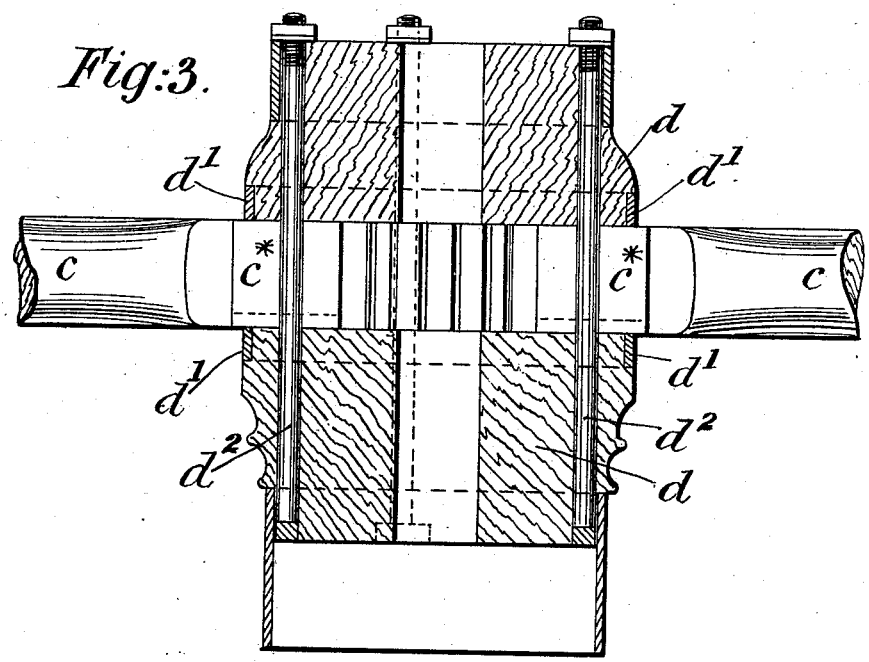
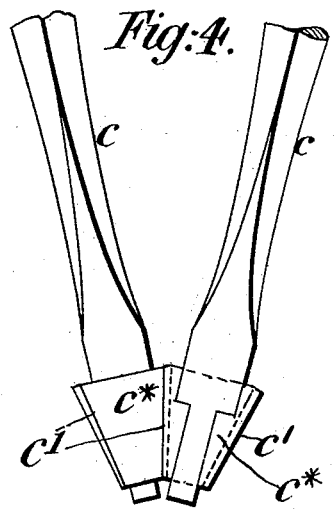
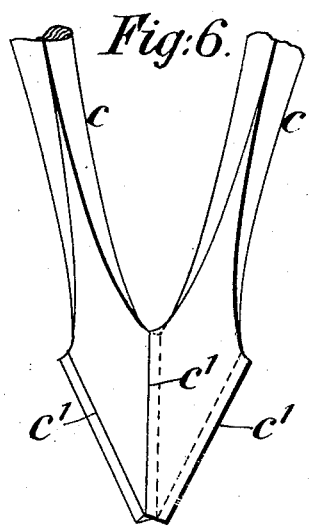
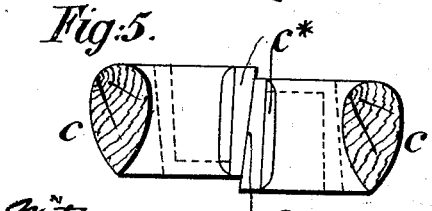

No. 717,404. Patented Dec. 30, 1902.
J. HOPPER.
WHEEL FOR VEHICLES.
(Application filed Apr. 29, 1902.)
(No Model.) 3 Sheets—Sheet 3.
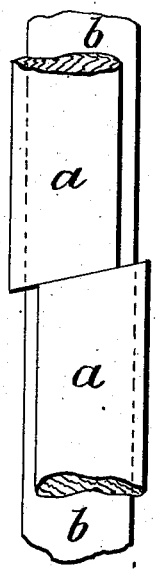
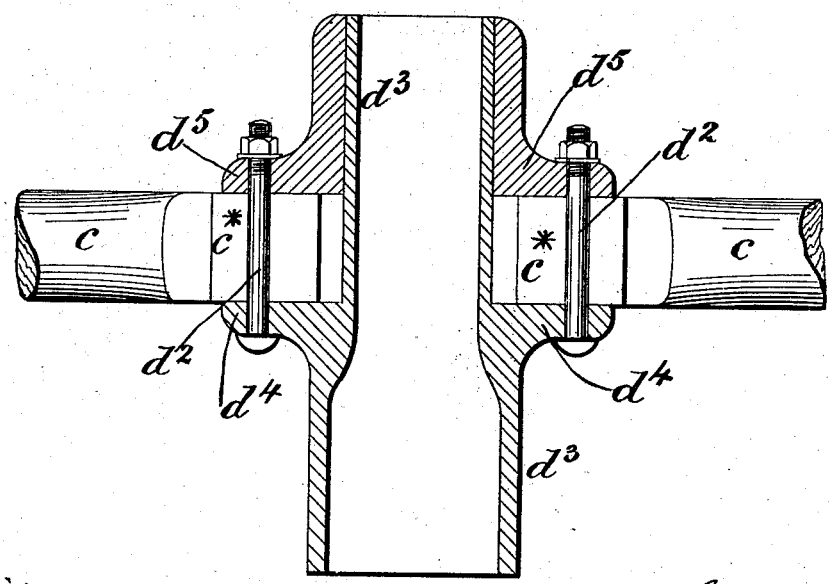

UNITED STATES PATENT OFFICE.

JOHN HOPPER, OF FULHAM, LONDON, ENGLAND.

WHEEL FOR VEHICLES.

SPECIFICATION forming part of Letters Patent No. 717,404, dated December 30, 1902.

Application filed April 29, 1902. Serial No. 105,144. (No model.)

*To all whom it may concern:*

Be it known that I, JOHN HOPPER, a subject of the King of Great Britain, residing at Fulham, in the county of London, England, have invented certain new and useful Improvements in the Construction of Wheels for Vehicles, of which the following is a full, clear, and exact description and for which I have made application for patent in Great Britain, dated October 7, 1901.

The invention has for its object improvements in the construction of wheels for vehicles.

Heretofore when using brazed tires in the construction of wheels it has been difficult to obtain a sufficient shrinkage of the tire onto the felly, as on account of the brazing the tire cannot be submitted to a sufficient heat to secure the required shrinkage.

I will describe my invention by the aid of the accompanying drawings, in which—

Figure 1:
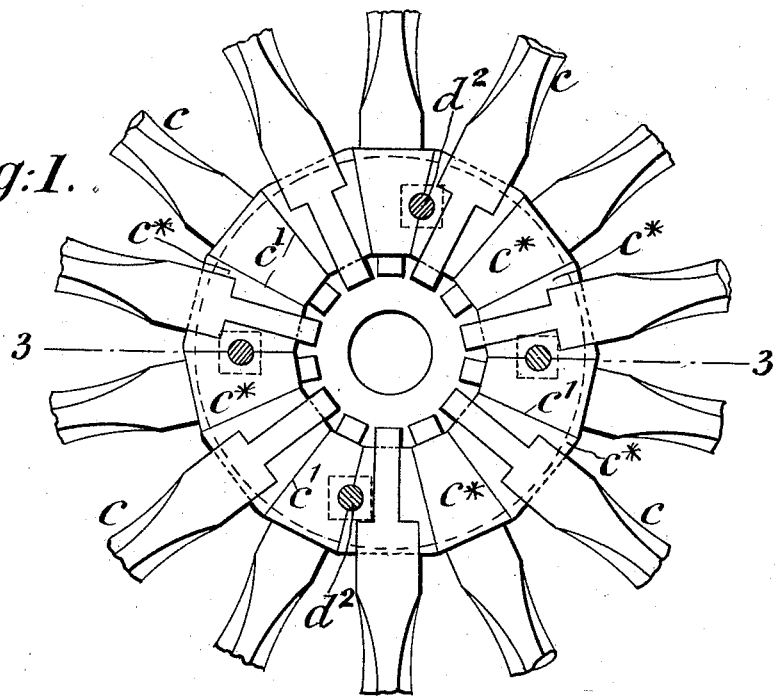
Figure 2:
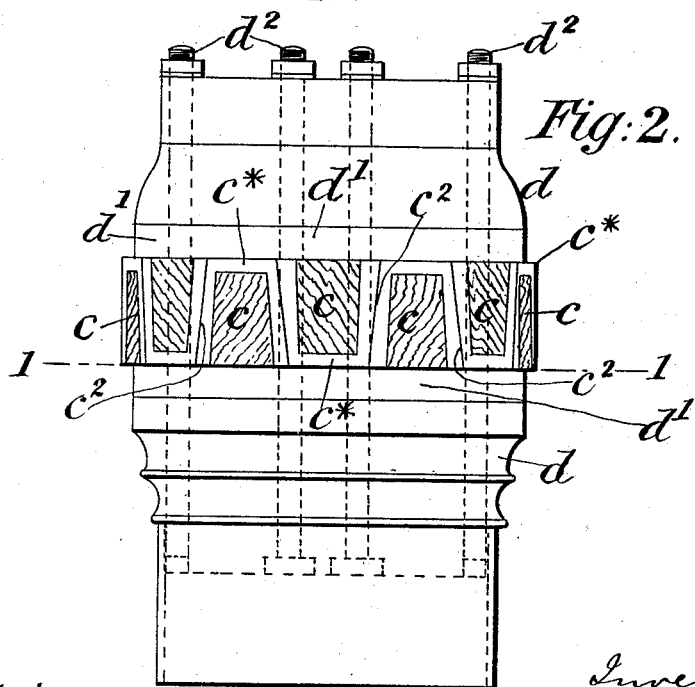

Figure 1 is a face view of the inner ends of the spokes of a wheel constructed according to my invention and drawn on the line 1 1 of Fig. 2. Fig. 2 is a plan view of Fig. 1, showing the spokes cut off flush with their inner end metal fittings for the sake of clearness. Fig. 3 is a section through the hub drawn on the line 3 3 of Fig. 1. Fig. 4 is a face view, and Fig. 5 is a plan view, of the inner ends of a pair of spokes, showing how they are placed together previous to being forced into the same plane. Fig. 6 is a face view, and Fig. 7 is a plan view, of a pair of spokes with their inner ends constructed entirely of wood. Fig. 8 represents a slight modification, and Fig. 9 is an inner side view of two ends of a pair of felly-sections within the tire previous to being forced into the final position.

In all the figures like parts are indicated by similar letters of reference.

According to my invention instead of shrinking the tire onto the felly I force the felly out to the tire.

In carrying my invention into effect I form the ends of the felly-sections $a$ slightly inclined transversely, (see Fig. 9,) and I form the said sections slightly larger than would be required to make a circle of the same size as the interior of the non-expanded tire $b$. In placing the felly-sections $a$ in position within the tire $b$ they will project alternately slightly beyond the edges of the tire. The transverse inclination of the meeting ends of the felly-sections is in a plane oblique to a line at the circumference of the wheel parallel with the axis, so that when the sections are forced together into the plane of the wheel the tendency will be to enlarge the circumference, resulting in the expansion of the felly forcibly against the unshrunk tire. I form the inner ends of the spokes $c$ tapered longitudinally—that is to say, radially—from the wheel-axle, as usual, as shown by the lines $c'$ in Figs. 1, 4, 6, to enable them to fit together solidly; but I also according to my invention form them of tapered cross-section, as shown by the lines $c^2$. (See Figs. 2, 5, 7.) This construction would prevent the inner ends of the spokes $c$ from being all in the same plane when placed together by hand and no force applied thereto. When, however, the felly $a$ and spokes $c$ are arranged within the tire in readiness to expand the felly against the tire, the two parts of the stock or nave $d$, furnished with circular metal rings or plates $d'$, are by the bolts $d^2$ bolted firmly against the side faces of the inner ends of the spokes, thereby forcing them into the same plane and in consequence of their cross-sectional taper form forcing their outer ends against the felly-sections and the latter outward against the tire. Then the felly-sections $a$ are forced into the same plane, whereby on account of their inclined ends no space is left at the joints.

At Fig. 8 an arrangement is shown whereby the inner ends of the spokes are forced into the same plane by the use of a metal stock or nave consisting of a sleeve $d^3$, formed with a fixed plate $d^4$ and a loose plate $d^5$, mounted on the sleeve $d^3$. The inner ends of the spokes are placed between the plates $d^4$ $d^5$, and the latter are drawn forcibly together by bolts $d^2$. Other suitable means may be employed to force the inner ends of the spokes into the same plane.

In Figs. 1 to 5 the inner ends of the spokes $c$ are represented as fitted with metal shoes $c^*$, on which the inclines $c'$ $c^2$ are formed, while in Figs. 6 and 7 the inner ends of the spokes are made entirely of wood.

What I claim as my invention, and desire to secure by Letters Patent, is—

1. In vehicle-wheels, the combination of spokes formed at their inner ends with radial and with oppositely-arranged transverse inclines, and felly-sections inclined at their meeting ends in planes oblique to a line at the circumference of the wheel parallel with the axis; whereby pressure in line of the axis, in forcing the sections into their proper plane, tends to enlarge the circumference of the felly, as explained.

2. In vehicle-wheels, the combination of spokes formed at their inner ends with radial and oppositely-arranged transverse inclines, two plates in contact with said inner ends, two parts of a stock or nave arranged outside said plates, bolts passed through said two parts for forcing them and the two plates into closer relative positions and consequently the spokes into the same plane, felly-sections inclined in a transverse direction at their ends, and a non-expanded tire, substantially as set forth.

3. In vehicle-wheels, the combination of spokes, metal shoes on the inner ends of said spokes, radial and oppositely-arranged transverse inclines on said shoes, two parts of a stock or nave, bolts passed through said two parts for forcing the ends of the spokes into the same plane, felly-sections inclined in a transverse direction at their ends, and a non-expanded tire, substantially as set forth.

In testimony whereof I affix my signature in presence of two witnesses.

JOHN HOPPER.

Witnesses:
   B. J. B. MILLS,
   WM. GIRLING.